United States Patent [19]
Evans

[11] 4,281,377
[45] Jul. 28, 1981

[54] POWER SUPPLY CIRCUITS

[75] Inventor: Kenneth S. Evans, Blackpool, England

[73] Assignee: Lucas Industries Limited, Birmingham, England

[21] Appl. No.: 47,315

[22] Filed: Jun. 11, 1979

[30] Foreign Application Priority Data

Jun. 21, 1978 [GB] United Kingdom ............... 27506/78

[51] Int. Cl.³ .............................................. H02M 3/18
[52] U.S. Cl. ....................................... 363/63; 363/60; 323/223
[58] Field of Search ................... 323/8, 22 T; 363/60, 363/63; 330/296, 297, 259, 138; 331/108 C, 108 D, 185, 186

[56] References Cited

U.S. PATENT DOCUMENTS

| | | | |
|---|---|---|---|
| 3,670,230 | 6/1972 | Rooney et al. ............... | 323/8 X |
| 3,821,627 | 6/1974 | Milovancevic ............... | 363/60 |
| 3,944,908 | 3/1976 | Oki ............................... | 363/63 |
| 4,045,719 | 8/1977 | Salzer ........................... | 323/22 T |

OTHER PUBLICATIONS

E. R. Hnatek, "Use Integrated Circuits in Transformerless DC-TO-DC Converters", Feb. 5, 1973, Electrical Design News, vol. 18, No. 3, pp. 58-60.

*Primary Examiner*—William M. Shoop
*Assistant Examiner*—Peter S. Wong
*Attorney, Agent, or Firm*—Holman & Stern

[57] ABSTRACT

A power supply circuit includes an operational amplifier oscillator, a buffer amplifier and a diode pump connected to provide a negative output relative to the more negative of two supply rails. The supply terminals of the operational amplifier are connected to one supply rail and the output of the diode pump respectively, so that when the circuit is first connected to the supply the operational amplifier is initially connected between the rails through the intermediary of the diodes of the diode pump.

5 Claims, 1 Drawing Figure

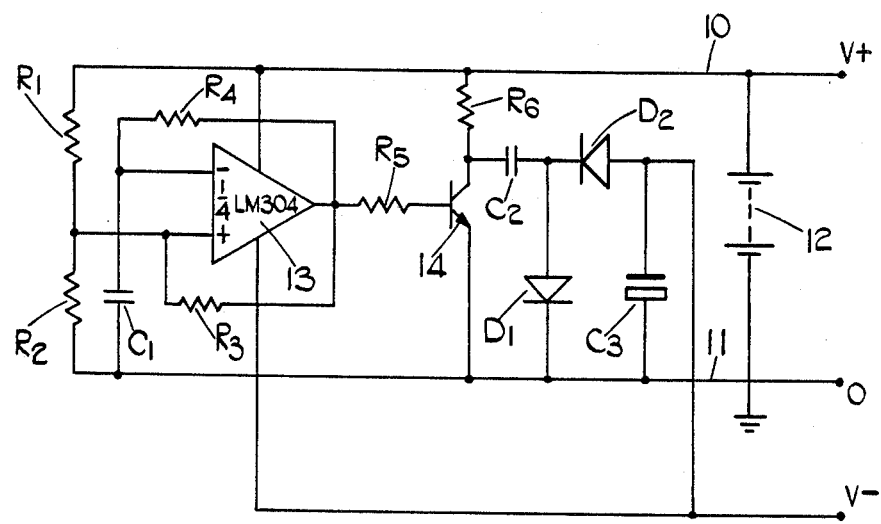

POWER SUPPLY CIRCUITS

This invention relates to power supply circuits for battery operated electrical equipment, for use, for example, in automotive vehicle electrical systems.

Many electrical circuits operate most satisfactorily when provided with a dual rail power supply providing both positive and negative supply voltage relative to the local earth. In the case of a vehicle electrical system however, one battery terminal, usually the negative one, is customarily connected to the vehicle earth.

It has already been proposed to derive a negative supply voltage utilizing an astable multivibrator, a buffer amplifier and a diode pump. Where operational amplifiers are being employed in the electrical equipment it is convenient to use such an amplifier as the active element of the astable multivibrator, but frequently it is most convenient to utilize multiple operational amplifers, of the gererally known kind in which two or more operational amplifiers are included in a common package, having common supply terminals. With such an arrangement the conventional circuit for deriving a negative supply cannot be used.

It is accordingly an object of the present invention to provide a circuit which can be used in these circumstances.

In accordance with the invention there is provided a power supply circuit comprising first and second power supply rails for connection to opposite poles of a power supply, an oscillator including an operational amplifier, a buffer amplifier connected across said first and second rails and connected to be driven by the output of said operational amplifier and a diode pump circuit connected between the output of said buffer amplifier and said second rail, characterised in that the supply terminals of the operational amplifier are connected to said first rail and the output terminal of the pump circuit respectively.

With such an arrangement, when the circuit is energised the supply terminals of the operational amplifier are initially connected to the first rail, and through the diodes of the diode pump circuit, to the second rail so that the oscillator starts to run. As the diode pump circuit produces an increasing output voltage, the working voltage of the operational amplifier increases.

It will be noted that any operational amplifiers in the same integrated circuit package as the operational amplifier of the astable multivibrator receive a correct dual voltage supply once the diode pump is producing its full output.

Preferably, the operational amplifier has a bias circuit comprising a pair of resistors in series between the first and second rails with their common point connected to the non-inverting terminal of the operational amplifier, a further resistor connecting the output terminal of the operational amplifier to the non-inverting input terminal thereof and a timing circuit comprising a resistor and capacitor in series between the output terminal of the operational amplifier and the second rail, the junction of said resistor and capacitor being connected to the inverting input terminal of the operational amplifier.

The accompanying drawing shows the circuit diagram of one example of a power supply circuit in accordance with the invention.

The power supply circuit shown includes first and second supply rails 10, 11 connected respectively to the positive and negative terminals of a vehicle battery 12, the negative terminal of the battery being grounded to the vehicle frame.

An operational amplifier 13, which is in fact one of four operational amplifiers in a quad operational amplifiers integrated circuit package (for example type LM324), has its non-inverting input terminal connected to the junction of two resistors $R_1$ and $R_2$ connected in series between the rails 10, 11. A positive feedback resistor $R_3$ connected between the output terminal of the amplifier 13 and its non-inverting input terminal gives the operational amplifier the transfer function of an inverting voltage comparator with hysteresis. A further resistor $R_4$ is connected in series with a capacitor $C_1$ between the output terminal of the amplifier 13 and the rail 11, the junction of the resistor $R_4$ and the capacitor $C_1$ being connected to the inverting input terminal of the amplifier 13.

The output terminal of the amplifier 13 is connected by a resistor $R_5$ to the base of an npn transistor 14, which has its emitter connected to the rail 11 and its collector connected by a load resistor $R_6$ to the rail 10. The transistor 14 acts as an inverting buffer amplifier.

The collector of the transistor 14 is connected to one side of a capacitor $C_2$, the other side of which is connected to the anode of a diode $D_1$ and to the cathode of a diode $D_2$. The cathode of the diode $D_1$ is connected to the rail 11 and the anode of the diode $D_2$ is connected to one side of a capacitor $C_3$, the other side of which is connected to the rail 11.

The anode of the diode $D_2$ is also connected to an output terminal V— and it will be noted that the supply terminals of the operational amplifier 13 are connected respectively to the rail 10 and the terminal V—.

When the circuit shown is not connected to the battery 12, all three capacitors $C_1$, $C_2$ and $C_3$ discharge. On connection to the battery, the operational amplifier 13 will receive its power supply from the battery 12, via the forwardly biassed diodes $D_1$, $D_2$ in series. Since the capacitor $C_1$ is discharged the inverting input of the amplifier 13 will be at ground potential, but the resistor network $R_1$, $R_2$, $R_3$ will put some higher voltage on the non-inverting input terminal. As a result the output of the amplifier 13 will rise to a voltage close to that on rail 10, thereby turning the transistor 14 hard on and maintaining the capacitor $C_2$ in its discharged state. The voltage on the non-inverting input of the amplifier 13 now becomes fixed at approximately $\frac{2}{3}V+$ (assuming that $R_1 = R_2 = R_3$) and the capacitor $C_1$ starts to charge via the resistor $R_4$. When the voltage on capacitor $C_1$ reaches $\frac{2}{3}V+$, the output of the amplifier 13 goes low, i.e. to a voltage close to that on rail 11, and transistor 14 will be turned off. In this state the capacitor $C_1$ starts to discharge through the resistor $R_4$ and the capacitor $C_2$ starts to charge through the resistor $R_6$. The time constant $R_6 C_2$ is arranged to be much less than the time constant $R_4 C_1$ so that before the voltage on capacitor $C_1$ has fallen to $\frac{1}{3}V+$, the capacitor $C_2$ has become substantially fully charged to a voltage equal to $V+$ less the forward voltage drop of diode $D_1$. When the output of amplifier 13 goes high again and transistor 14 turnes hard on, the left hand side of capacitor $C_2$ assumes almost ground voltage so that its right hand side takes up a negative voltage. This causes diode $D_2$ to be forwardly biased so that the charge on capacitor $C_2$ is shared between capacitors $C_2$ and $C_3$, leaving a negative voltage on capacitor $C_3$.

From this point in the operation the operational amplifier 13 will pass current into capacitor $C_3$ instead of through the diodes $D_1$, $D_2$. When the output of amplifier 13 next goes low it will fall to a voltage below that of the rail 11, thereby decreasing the voltage at the noninverting input terminal below $\frac{1}{3}V^+$ and correspondingly increasing the rate of discharge of capacitor $C_1$.

During each cycle of operation of the astable multivibrator the voltage at terminal $V-$ falls until it stablishes at a level almost as far below earth as the voltage on rail $V+$ is above earth, the difference being accounted for by the forward voltages of the diodes $D_1$ and $D_2$ and the saturation voltage of the transistor 14.

It will be appreciated that the other operational amplifiers in the integrated circuit package are powered from the rail 10 and the terminal $V-$. Other operational amplifiers may also be connected to the power supply circuit described above.

I claim:

1. A power supply circuit comprising first and second power supply rails for connection to opposite poles of a power supply, an oscillator including an operational amplifier having first and second supply terminals, a buffer amplifier connected across said first and second rails and connected to be driven by the output of said operational amplifier and a diode pump circuit connected between the output of said buffer amplifier and said second rail, characterized in that the first and second supply terminals of the operational amplifier are connected to said first rail and the output terminal of the pump circuit, respectively.

2. A power supply circuit as claimed in claim 1 in which the operational amplifier has inverting and non-inverting input terminals and a bias circuit comprising a pair of resistors in series between the first and second rails with their common point connected to the non-inverting terminal of the operational amplifier, a further resistor connecting the output terminal of the operational amplifier to the non-inverting input terminal thereof and a timing circuit comprising a resistor and capacitor in series between the output terminal of the operational amplifier and the second rail, the junction of said resistor and capacitor being connected to the inverting input terminal of the operational amplifier.

3. A power supply circuit as claimed in claim 1 or claim 2 in which said operational amplifier is one of a plurality of operational amplifiers in an integrated circuit, said plurality of operational amplifiers having common supply terminals.

4. A power supply circuit as claimed in claims 1 or 2 in which the buffer amplifier comprises a transistor having its base connected by a resistor to the output of the operational amplifier, its emitter connected to one supply rail and its collector connected by a resistor to the other supply rail.

5. A power supply circuit as claimed in claim 4 in which said diode pump comprises a first capacitor connected at one side to the collector of the transistor, a first diode having its anode connected to the other side of said first capacitor and its cathode connected to said one supply rail, a second diode having its cathode connected to said other side of said first capacitor and its anode connected to the diode pump output terminal and a second capacitor connected between the diode pump output terminal and said one supply rail.

* * * * *